United States Patent [19]

Eckman et al.

[11] Patent Number: 5,340,917

[45] Date of Patent: Aug. 23, 1994

[54] SYNDIOTACTIC POLYPROPYLENE, METHODS FOR PRODUCING AMORPHOUS SYNDIOTACTIC POLYPROPYLENE AND APPLICATIONS THEREOF

[75] Inventors: Richard R. Eckman; Andrew J. Peacock; Paul M. Henrichs, all of Houston, Tex.

[73] Assignee: Exxon Chemical Patents Inc., Linden, N.J.

[21] Appl. No.: 59,058

[22] Filed: May 7, 1993

[51] Int. Cl.$^5$ .................... C08F 6/26
[52] U.S. Cl. .................... 528/481; 528/503
[58] Field of Search .................... 528/481, 503

[56] References Cited

U.S. PATENT DOCUMENTS 4,824,629  4/1989  Seitz et al. .................... 264/291
4,950,720  8/1990  Randall, Jr. et al. .................... 525/240

FOREIGN PATENT DOCUMENTS 428972  5/1991  European Pat. Off. .
451743  10/1991  European Pat. Off. .
466926  1/1992  European Pat. Off. .

OTHER PUBLICATIONS

Techpak Technology, p. 4, Apr. 5, 1993.

Primary Examiner—Joseph L. Schofer
Assistant Examiner—Tom Weber
Attorney, Agent, or Firm—Catherine L. Bell

[57] ABSTRACT

This invention relates to syndiotactic polypropylene having greater than 55% racemic dyads having elastic characteristics at room or ambient temperature, a method for producing said syndiotactic polypropylene and articles made therefrom.

8 Claims, 3 Drawing Sheets

SYNDIOTACTIC POLYPROPYLENE, METHODS FOR PRODUCING AMORPHOUS SYNDIOTACTIC POLYPROPYLENE AND APPLICATIONS THEREOF

FIELD OF THE INVENTION

This invention relates to syndiotactic polypropylene, particularly syndiotactic polypropylene (sPP) having amorphous characteristics. This invention also relates to processes for molding or forming articles out of this syndiotactic polypropylene and for processing syndiotactic polypropylene. Likewise, this invention relates to articles formed by these processes.

BACKGROUND OF THE INVENTION

Polypropylene is a thermoplastic widely used to manufacture plastic containers, bottles, structural components, films for packaging and a host of other materials. More than 10 billion pounds of polypropylene are produced worldwide each year. All commercial polypropylene today is composed of isotactic polypropylene, (the molecular chain structure has the methyl group side branches all placed on the same side with respect to the polymer chain backbone), or atactic polypropylene (the methyl group side branches are placed at random with respect to the polymer chain backbone).

Recently it has become feasible to produce a new type of polypropylene called syndiotactic polypropylene in which the methyl group side branches are placed on alternating sides of the polymer chain backbone. Syndiotactic polypropylene has been found to have properties quite different from that of previous isotactic and atactic polypropylenes. Since the chain microstructure and crystallization behavior of these semi-crystalline syndiotactic polypropylene polymers are significantly different than that of isotactic polypropylene polymers, syndiotactic polypropylene cannot automatically be used as a direct substitute in any current process where isotactic polypropylene is used.

Thus, there have appeared in the art methods for processing and making molded articles of syndiotactic polypropylene. For example, European Patent Application 428,972 discloses a method for making molded articles of syndiotactic polypropylene comprising heating, melting, then hot molding a homopolymer of syndiotactic polypropylene followed by quenching and optionally followed by heat treatment at a temperature less than the melting point of the syndiotactic polypropylene. (Quenching is a method used in the art to control crystallization in polyolefin processing). 972's method does not provide, however, a method for molding, shaping or forming the polymer at temperatures below 80° C. Thus, it is desirable that methods for modeling syndiotactic polypropylene at temperatures below 80° C. be provided. It would be further desirable if there were provided a method to process syndiotactic polypropylene such that syndiotactic polypropylene could be utilized as freely as isotactic polypropylene.

SUMMARY OF THE INVENTION

The present invention is related to the discovery that when substantially molten syndiotactic polypropylene is quenched at a rapid rate to a temperature near the glass transition temperature (Tg) of the syndiotactic polypropylene or below, that the syndiotactic polypropylene is unusually soft and flexible for a period of time. In particular, this invention also relates to syndiotactic polypropylene having 55% or greater racemic dyads having a Young's modulus of less than about 200 MPa; at 0°–30° C. after treatment.

Likewise, methods for processing the syndiotactic polypropylene and for forming molded articles therefrom and the articles themselves are also provided for in this invention.

DESCRIPTION OF PREFERRED EMBODIMENTS

Figure 1:
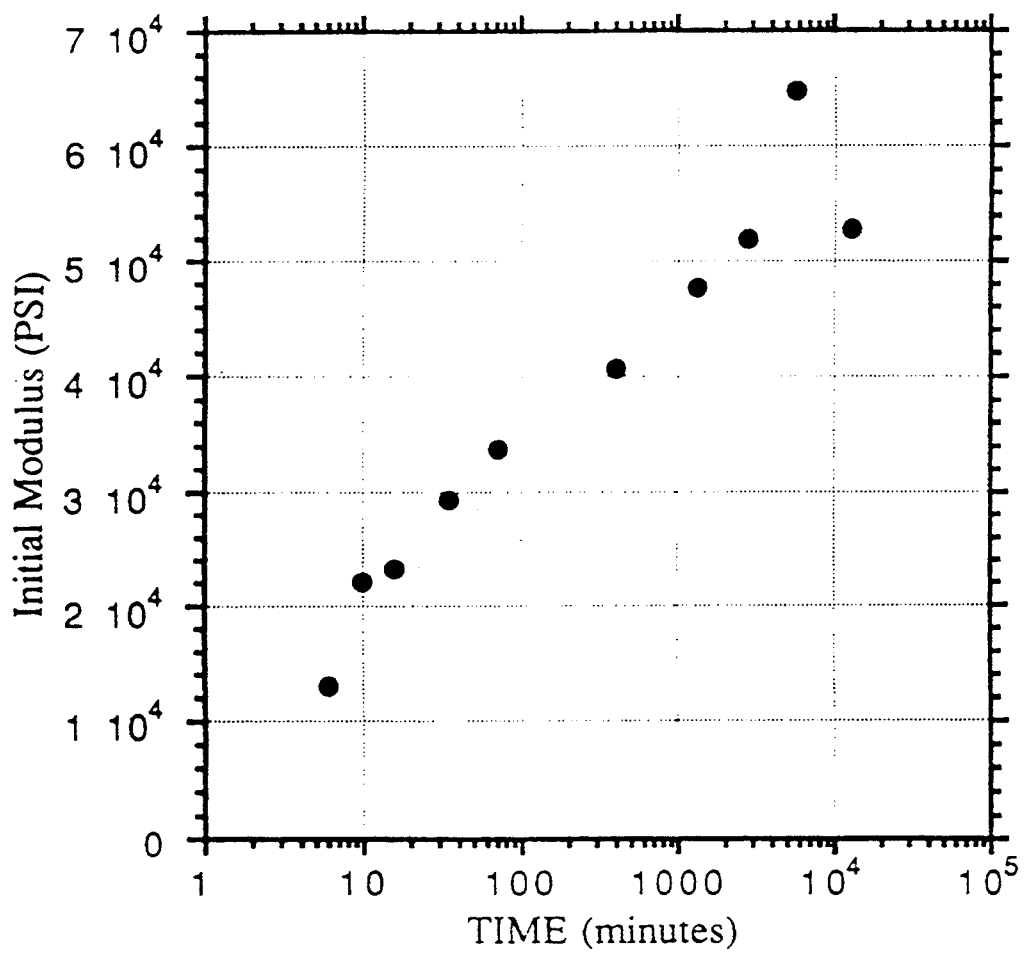
FIG. 1 is a graph of the initial modulus versus time of the "treated" syndiotactic polypropylene from example 1.
Figure 2:
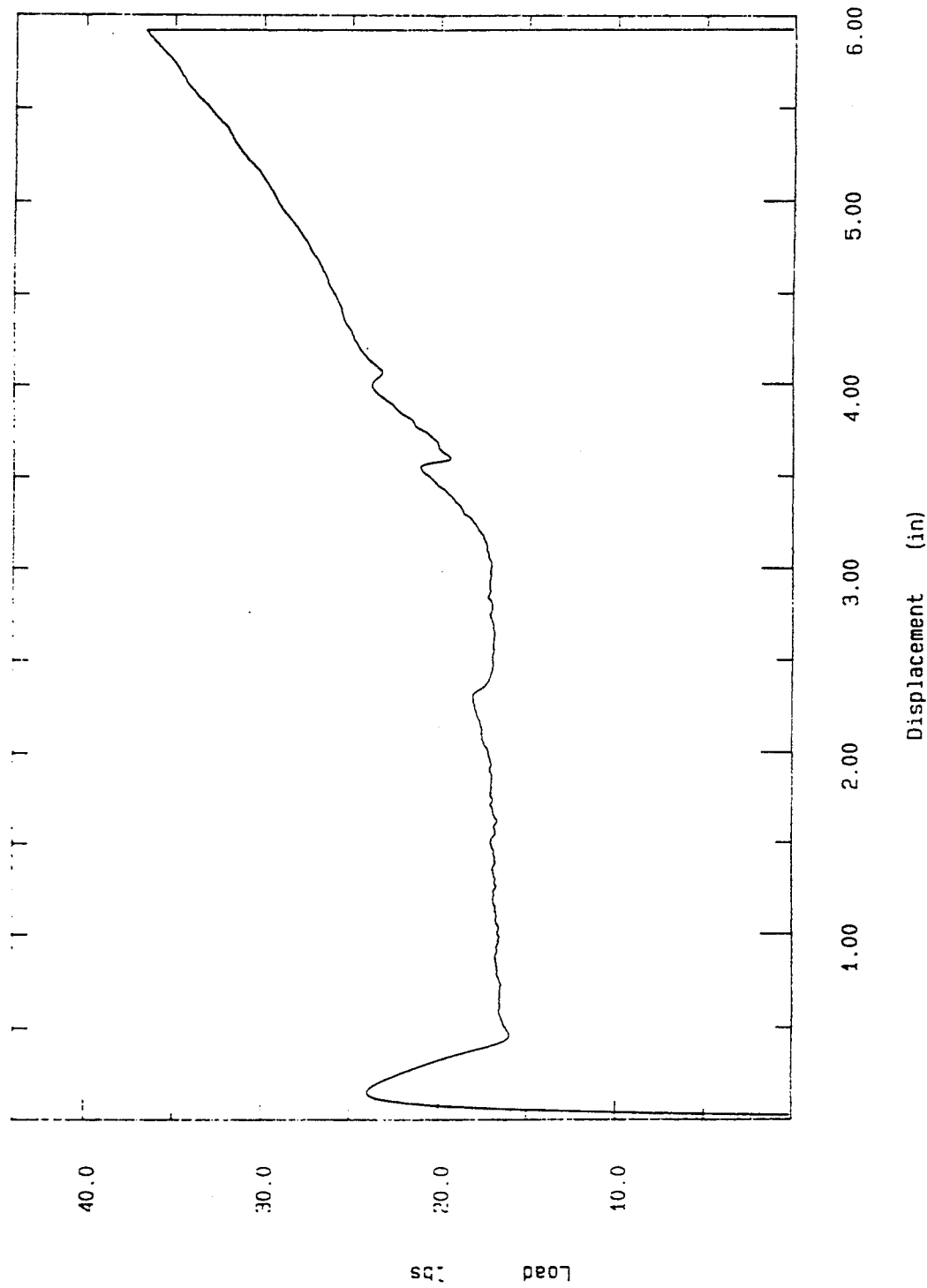
FIG. 2 is a force/elongation curve for untreated syndiotactic polypropylene.
Figure 3:
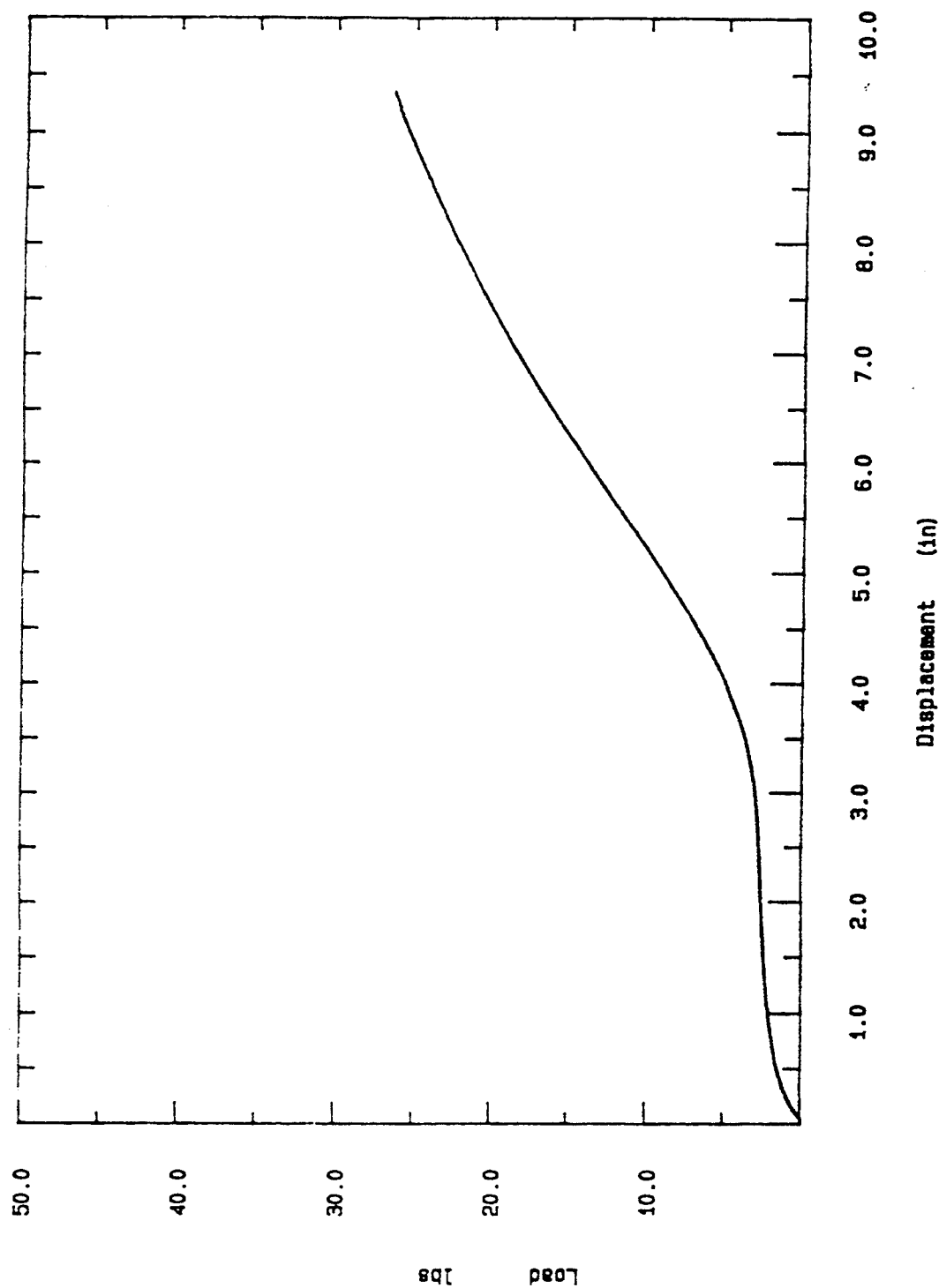
FIG. 3 is a force/elongation curve for treated syndiotactic polypropylene.

This invention relates to syndiotactic polypropylenes having greater than about 55% racemic dyads, having unique properties at 80° C. or less, preferably 0°–30° C., particularly at ambient or room temperature. This invention further relates to methods for forming articles from syndiotactic polypropylene to methods for processing the syndiotactic polypropylene.

Any syndiotactic polypropylene may be processed or utilized in this invention, however, syndiotactic polypropylene having greater than 55% racemic dyads is preferred. In an alternate embodiment syndiotactic polypropylene having greater than 80% racemic dyads is also preferred. The syndiotactic polypropylenes can be homopolymers or copolymers of propylene, or they may be mixed or blended with other polymers, modifiers or additives known to those of ordinary skill in the art.

For the purposes of this invention and any claims thereto, polypropylene is defined to include homopolymers of polypropylene or copolymers of propylene and one or more comonomers. The comonomers include any vinyl comonomer or olefin, preferably ethylene or a $C_4$ to $C_{20}$ α-olefin, even more preferrably a $C_4$ to $C_{12}$ α-olefin. Preferred vinyl comonomers include styrene, vinyl acetate, vinyl chloride and the like.

In general these unique syndiotactic polyolefins are typically made with activated cyclopentadienyl transition metal catalysts. These catalysts usually consist of two parts, the first part being a mono- or bis- substituted or unsubstituted cyclopentadienyl transition metal complex and the second component being an alumoxane, preferably a methyl alumoxane, or a non-coordinating anion. This class of catalyst is disclosed in U.S. Pat. Nos. 5,055,438, 5,057,475, 5,096,867, U.S. Ser. No. 07/542,236 pending, EPA 520,732 published Dec. 30, 1992, EPA 129,368 published Dec. 27, 1984, U.S. Ser. No. 07/468,382 abandoned, U.S. Pat. No. 5,017,714, U.S. Ser. No. 07/737,611 now U.S. Pat. No. 5,198,407, U.S. Pat. No. 5,153,157, EPA 277,003/004 both published Jun. 3, 1988, and U.S. Ser. 07/926,006 pending, and EPA 426,645, 428,927 published May 29, 1991; 433,986 published Jun. 26, 1991; EPA 433,987 published Jun. 26, 1991; EPA 423,100 published Apr. 17, 1991. The last four references in particular are directed to preparation of syndiotactic polyolefins. European Patent Application 426,645 describes syndiotactic copolymers of propylene and olefins having greater than 80% racemic dyads. Each of the above references is herein incorporated by reference as if fully set forth.

The syndiotactic polypropylene is heated to a molten or substantially molten state and is rapidly quenched to a temperature about 30° above the Tg of that syndiotactic polymer or less, more preferably below 0° C., preferably below the Tg, even more preferably below −10° C. The rate of quenching is preferably 250° C./minute or more, preferably 300° C./minute or more. The syndiotactic polypropylene is then molded or otherwise altered by the application of force. If the syndiotactic polypropylene is quenched to below its Tg or below 0° C. it should be allowed to warm up to above about 0° C. before the application of force. Polypropylene which has been subjected to this process will be referred to as "treated".

The force is preferrably applied at about 60 degrees C or below, preferrably at about 50 degrees C or below, even more preferreably at about 40 degrees C, and even more preferrably at about 30 degrees C or below. Preferred temperature ranges for applying force are From about 60 degrees C to about 0 degrees C, preferrably from abut 45 degrees C to about 5 degrees C, more preferrably from about 30 degrees C to about 10 degrees C.

The syndiotactic polypropylene treated using the above process is unique in that for a certain period of time it exhibits "flexible" properties such as a Young's modulus of 200 MPa or less, preferrably 140 MPa or less, more preferrably 100 or less, even more preferrably 80 or less and then goes through a visible transformation to a hardened semi-crystalline state. These treated sPPs are initially clear to the human eye, after a period of time they visibly haze, and then become clear again. The clarity in the final state is exceptionally good. The treated sPP may remain in this "flexible" state for varying amounts of time depending on the temperature across the sample. If held at a temperature below it's Tg, the treated sPP will not crystallize, if held near its Tg the sPP may slowly crystallize, while sPP allowed to "warm up" will go through visible transformation. In a preferred embodiment, the treated sPP remains "flexible" at ambient or room temperatures for about 10 minutes or less, more preferably about 5 minutes or less, even more preferably about 3 minutes or less. These times are long enough for the application of force in a commercial process but short enough that an existing commercial process would not have to slow down to accommodate the treated sPP at a commercial rate. In a preferred embodiment crystallization of the treated sPP substantially continues at a diminishing rate for many days and is substantially complete after about 10 to 15 days. Substantially complete sPP will undergo less than a 5% change in crystallinity over a period of a week or more.

In general, the treated syndiotactic polypropylene in the flexible state has a Young's modulus of about 200 MPa or less, preferably 140 MPa or less at 0°–30° C., preferably at room or ambient temperatures. Treated syndiotactic polypropylene that has been allowed to crystallize has a ductile to brittle transition temperature of 100° C. or higher, preferably 110° C. or higher. Interestingly enough this is generally 10° higher than the ductile to brittle transition of untreated syndiotactic polypropylene. Likewise, films of the treated syndiotactic polypropylenes allowed to crystallize have excellent clarity and have a haze of 10% or less, preferably 5% or less, as measured by ASTM D1003 and have optical transparency of greater than 80% transmission, preferably greater than 90% transmission. The term "optically transparent" as used herein means an article having a transmittance of visible light, wavelength 0.4–0.8 micrometers, of at least 80% for path length of 0.001 inch or at least 50% for path length of 0.1 inch. Likewise, the treated sPP does not display "necking" behavior when drawn.

The treated syndiotactic polypropylene is best used soon after the modification process but can be stored at temperatures below its Tg for later use. At room temperature the modified polymer is best used soon after treatment. As a general rule, the rate of crystallization of the modified syndiotactic polypropylene is dependent upon time and the uniformity of the temperature change across the sample. Longer times for molding and the application of other force are available at lower temperatures and samples with uneven temperatures across the sample also crystallize more unevenly. Once the treated syndiotactic polypropylene has been molded, deformed or shaped into the desired article, the polypropylene can be allowed to crystallize. One of the unique aspects of this invention is that while soft and flexible at room temperature, after treatment the syndiotactic polypropylene will, after time, crystallize, become more rigid and regain clarity. The sPP is preferably used soon after treating and preferably has force applied to form it into an article at 0° C. to 30° C., preferably 10° C. to 30° C. within three minutes, preferably one minute.

The syndiotactic polypropylene of this invention can be made into films, molded articles, blown articles, vacuum formed articles and the like. Films of the treated polypropylene could be made by incorporating the quenching procedure into a film casting and/or chill roll process, a film of the treated polypropylene could be drawn or tentered immediately after quenching, and for long periods of time after quenching when the film is held at or near the quenching final temperature, thus producing a uni- or biaxially oriented film. Treated and drawn syndiotactic polypropylene film is characterized by a very high transparency and a haze of 10% or less, preferably 5% or less.

Articles made with treated sPP, could be deformed, vacuum formed, thermo formed or blow molded with pressure, or other applied force immediately after quenching and for long periods of time after quenching if held at or near a low quenching temperature. Likewise the treated polypropylene could be altered with pressure or other applied force some long time after its preparation if the treated polypropylene is prevented from crystallizing by maintaining it at a temperature below its Tg.

In addition, mechanically embossed, imprinted or textured films or articles of the treated polypropylene can be made. Such films could be made by incorporating the quenching and embossing procedures into a film rolling or chill rolling process. A film made of the treated polypropylene can be embossed immediately after quenching; likewise treated syndiotactic polypropylenes formed into films that are then embossed with appropriate fine texturing would have more than ordinary paintability.

Embossed articles could be made from the treated polypropylene by stamping, rolling, brushing and other methods where a solid surface or object is applied with pressure against the polypropylene. Once the treated polypropylene has crystallized, the imprint is frozen into the article and the print becomes permanently indelible as long as the article is kept below its melting point. Thus, embossed or imprinted articles of very high clarity can be made and films of polypropylene with various textured surfaces can be made. For example, films of polypropylene which are more paintable or coatable than ordinary polypropylene can be made by imprinting or brushing a latching pattern on the surface. Information storage articles could also be made from the modified polypropylene by stamping, compression or imprinting methods. Patterns could also be recorded on the modified polypropylenes such as for templates for integrated circuit boards, templates for engineering designs, recording of human fingerprints or other characteristics. Articles for recording information could also be produced such as card key devices, consumer debit or credit cards, tickets for automatic turnstiles, gates or security devices, texts in the Braille language, raised letter articles for printing or other information transfer devices and the like.

A film of the treated syndiotactic polypropylene could be used to capture fingerprints or other impressions of texture immediately after quenching and for long periods of time after quenching when the modified polypropylene is held at or below the Tg of the material. In addition, the treated syndiotactic polypropylene can be used to make structurally complicated or "snap fit" type molded parts. The parts could be molded at a temperature above the sPP's Tg immediately after quenching or long after quenching if the treated sPP is held at or below its Tg. The molded part could then be placed into the appropriate position and allowed to crystallize and harden, therefore allowing greater flexibility in placing the part and greater strength in the final product after crystallization. Likewise, more complicated parts can be fabricated in fewer steps or molds. Since the treated syndiotactic polypropylene is flexible, it can be pulled or popped out of a complicated mold that a stiff part could not. This attribute could be used to simplify a fabrication process by making in one or two steps what used to take multiple steps. The modified sPP has the property of easily accepting hardware fasteners, and the like. Likewise, one could bolt, hinge or otherwise attach two or more portions of treated sPP or one treated and one or more non-treated portions or some other material with greater ease. Other materials include metal, wood, paper, cardboard, glass, stone, concrete, asphalt, plastics, thermoplastics, elastomerics, polyolefins, cloth, ceramics and the like.

Treated sPP materials could also be used as casting materials for broken bones, used in dental appliances, or used to produce safety gear and molded parts for athletes, construction workers and the like. A film of these materials could also be used to capture a fingerprint or other information and would allow for the digitization of the information by digital or optical scanner and the like for entry into a computer database. Likewise, permanent fingerprints could be affixed to credit cards by using a small piece of film of this material thus allowing for greater security in the credit card industry.

Many modifications and variations besides the embodiments specifically mentioned above may be in the compositions and methods described herein.

EXAMPLES

The optical transparency of a film was measured on a Gardner photometer model PG5500 by the transmission of light of about 600 nanometers wave length.

Young's modulus, also called elastic modulus, was measured for microtensile specimens with diemensions as set forth in ASTM 1708. The elastic modulus was calculated from the initial slope of the force/elongation curve recorded at an elongation rate of one inch per minute. (1 inch equals 2.54 centimeters).

Haze and transparency were measured by ASTM D1003.

Ductile to brittle transition is defined as the range of temperatures over which the tensile failure changes in character: below the transition temperature (but above the glass transition temperature) samples fail by the process of yielding, followed by necking and cold drawing, above the transition temperature (but below the melting temperature) samples draw about 5% prior to break.

Molecular weight (Mw and Mn) were measured by Gel Permeation Chromatography using a Waters 150C gel permeation chromatograph equipped with a differential refractive index (DRI) detector and calibrated for isotactic polypropylene. The numerical analyses were performed using the commercially available standard gel permeation chromatography software analysis package.

Example 1

Syndiotactic polypropylene having 93% racemic dyads of about 120,000 weight average molecular weight (Mw) was heated to 170° C. for two minutes under about 5000 lbs of force with a hot press to produce a film of 0.020 inches thickness. After which time the press was opened, the sample was removed and quenched by quickly placing it between two aluminum plates each of one inch thickness which had been precooled to the temperature of liquid nitrogen.

The film was soft and pliable after quenching and being allowed to warm above its Tg. After a few minutes the film hazed and became much more rigid and then cleared again. Fingerprints, indentations or other imprints made in the film in the elastic state were then maintained in form and "frozen" after a few minutes. The film was very transparent or clear as compared to a film made of isotactic polypropylene by the same method.

Example 2

About 6.5 grams of sPP containing 93% racemic dyads (sPP) as measured by Carbon 13 NMR analysis was placed in the chase and heated to a temperature of 170° C. with a force of about 5000 lbs for about 3 minutes after which time the press was opened, the sample removed and quickly placed between two aluminum plates each of one inch thickness which had been precooled in cryogenic liquid nitrogen to a temperature near that of liquid nitrogen or well below −100° C. The film was unusually malleable when removed from the aluminum plates and allowed to warm up above Tg.

Example 3

The procedure of example I was followed except that the syndiotactic polypropylene was heated to 210° C. for three minutes and when the sample was removed it was placed between water cooled plates of the press which were at room temperature.

Example 4

The procedure of example 2 was followed except that the polymer was heated for three minutes and the sample was removed and quickly placed between two aluminum plates which were initially at room temperature. The film was unusually malleable when removed from the aluminum plates.

Example 5

The procedure of example 2 was followed except that the press was heated to 210° C. and the polymer was allowed to very slowly cool in the press for several hours.

Example 6

The procedure of example 2 was followed except that the sPP was heated for three minutes and the sample was removed and quickly placed between two aluminum plates which were initially at zero degrees C. The film was unusually malleable when removed and allowed to warm up above its Tg.

Example 7

The procedure of example 2 was followed except that isotactic polypropylene was utilized.

Table 1 contains the characterization data for examples 1-6.

TABLE 1

| sPP Ex's | 1 | 2 | 3 | 4 | 5 | 6 |
|---|---|---|---|---|---|---|
| Young's Modulus (MPa) | 90* | | | | | 11–133** |
| Haze after drawing (%) | | 9.0 | 42.1 | 13.3 | 78.3 | 8.1 |
| Ductile to Brittle Trans (deg. C.) | | | 90–100 | | | 110–115 |

*6 min after quenching
** 1 to 10 min after quenching

As apparent from the foregoing description, the materials prepared and procedures followed relate to specific embodiments of the broad invention. It is apparent from the foregoing description and the specific preferred embodiments that while forms of the invention have been illustrated and described, various modifications can be made without departing from the spirit and scope of this invention. Accordingly, it is not intended that the inventions be limited thereby.

We claim:

1. A method for forming articles from syndiotactic polypropylene having 55% or greater racemic dyads comprising
   (a) heating the syndiotactic polypropylene to a substantially molten state;
   (b) quenching the syndiotactic polypropylene by rapidly reducing he temperature of the syndiotactic polypropylene to a temperature of 30° C. above the syndiotactic polypropylene's Tg or less, and
   (c) forming the quenched syndiotactic polypropylene at a temperature below 50° C. before the syndiotactic polypropylene visibly hazes.

2. The method of claim 1, further comprising allowing the syndiotactic polypropylene to crystallize.

3. The method of claim 1, wherein the syndiotactic polypropylene is quenched at a rate of 250° C. per minute or more.

4. The method of claim 1, wherein step (c) comprises, forming, blowing, blow molding, molding or vacuum forming the quenched syndiotactic polypropylene.

5. The method of claim 1, wherein the force is applied between about 30° C. to about 10° C.

6. The method of claim 1 further comprising embossing a pattern on the quenched syndiotactic polypropylene.

7. The method of claim 1, wherein the quenched syndiotactic polypropylene has a Young's modulus of 200 MPa or less.

8. The method of claim 1, wherein the syndiotactic polypropylene is formed into a film after quenching.

* * * * *